United States Patent Office 3,657,211
Patented Apr. 18, 1972

3,657,211
CONTINUOUS PRODUCTION OF ETHYLENE HOMOPOLYMERS
Klaus Steigerwald and Oskar Buechner, Ludwigshafen, and Friedrich Urban and Helmut Pfannmueller, Limburgerhof, Germany, assignors to Badische Anilin- & Soda-Fabrik Aktiengesellschaft, Ludwigshafen (Rhine), Germany
No Drawing. Filed Feb. 11, 1970, Ser. No. 10,586
Claims priority, application Germany, Feb. 22, 1969, P 19 08 964.6
Int. Cl. C08f *3/04, 1/60*
U.S. Cl. 260—94.9 R      4 Claims

ABSTRACT OF THE DISCLOSURE

Production of ethylene homopolymers by polymerization of ethylene under the action of organic hydroperoxides and oxygen as free-radical-generating polymerization initiators and of polymerization modifiers at elevated temperature and superatmospheric pressure in a tubular reactor having two successive reaction zones, a mixture of ethylene, polymerization initiator and polymerization modifier being introduced continuously at the beginning of each reaction zone. Specific temperature conditions, a hydroperoxide having a specific relatively high half value temperature and a polymerization modifier having a specific relatively high $C_s$-value are used in the first reaction zone, and specific temperature conditions, oxygen and a polymerization modifier having a specific relatively high $C_s$-value are employed in the second zone. The ethylene homopolymers obtained have a narrow molecular weight distribution and are practically devoid of very high molecular weight constituents.

---

The present invention relates to a process for the continuous production of ethylene homopolymers by polymerization of ethylene under the action of organic hydroperoxides and oxygen as free-radical-generating polymerization initiators and of polymerization modifiers at reaction temperatures of from 250° to 340° C. and pressures of from 1500 to 4000 atmospheres in a tubular reactor which has two successive reaction zones of about equal length, a mixture of ethylene, polymerization initiator and polymerization modifier being continuously introduced into the reactor at the beginning of each reaction zone.

The following is typical for prior art methods of this type (cf. for example French patent specifications Nos. 1,202,623 and 904,000 and the published papers of Belgian Pat. 943,980).

A mixture of ethylene, a polymerization initiator having a relatively low half value temperature (such as oxygen) and a polymerization modifier is introduced into the first reaction zone, where the reaction temperature is kept relatively low. A mixture of ethylene, a polymerization initiator having a relatively high half value temperature and a polymerization modifier is introduced into the second reaction zone where the reaction temperature is kept relatively high. In this way products having a wide molecular weight distribution are obtained; consequently they have an inferior appearance (poor transparency, poor gloss). The products not only have a wide molecular weight distribution but also a relatively large fraction of very high molecular weight constituents. The latter may be a disadvantage; they result, inter alia, in the molten polymer having a poor "draw-down," i.e. in the extrusion of film there is an increasing tendency for flaws (specks and holes) to form as the thickness of the film decreases.

The object of the present invention is to provide a process of the type defined above with which it is possible to prepare ethylene homopolymers which not only have a narrow molecular weight distribution (and consequently high transparency and high gloss) but also are practically devoid of very high molecular weight constituents.

We have found that the said object is achieved by using in the first reaction zone specific temperature conditions, a hydroperoxide having a specific relatively high half value temperature and a polymerization modifier having a specific relatively high $C_s$ value and in the second reaction zone specific temperature conditions, oxygen and a polymerization modifier having a specific relatively high $C_s$ value.

Accordingly, the present invention relates to a process for the continuous production of ethylene homopolymers by polymerization of ethylene under the action of an organic hydroperoxide and oxygen as free-radical-generating polymerization initiator and of polymerization modifier at reaction temperatures of 250° to 340° C. and pressures of from 1500 to 4000 atmospheres in a tubular reactor which has two successive reaction zones of about the same length, a mixture of ethylene, polymerization initiator and polymerization modifier being introduced continuously into the reactor at the beginning of each reaction zone.

The process according to the invention comprises: (1) introducing at the beginning of the first reaction zone a mixture at a temperature of from 185° to 220° C. and a pressure of from 1500 to 4000 atmospheres which contains an amount by weight equivalent to from 1 to 5 mole p.p.m. (with reference to the ethylene) of an organic hydroperoxide having a half value temperature within the range from 200° to 260° C. and 0.3 to 0.7 percent by weight of a polymerization modifier having a $C_s$ value of $1.0 \times 10^{-2}$ to $4.0 \times 10^{-1}$, and keeping the reaction temperature in said zone within the range from 305° to 340° C.; and (2) introducing at the beginning of the second reaction zone a mixture at a temperature of from 140° to 210° C. and a pressure of from 1500 to 4000 atmospheres which contains an amount by weight of oxygen which is equivalent to from 5 to 100 mole p.p.m. (with reference to the ethylene) and from 40 to 60% by weight of the amount used in said first reaction zone per 100 parts by weight of ethylene of a polymerization modifier having a $C_s$ value of from $1.0 \times 10^{-2}$ to $4.0 \times 10^{-1}$, and keeping the reaction temperature in said second reaction zone within the range from 250° to 305° C., with the proviso that the ratio by weight of the mixture introduced per unit time into said first and second reaction zones is from 1:2 to 2:1.

This process enables ethylene homopolymers to be prepared which not only have a narrow molecular weight distribution but are also practically devoid of very high molecular weight constituents.

Conventional tubular reactors are suitable for carrying out the process. The process may also be carried out in a conventional manner provided due regard is had to the pecularities according to the invention outlined above. Rather than give further details, reference is made for example to U.K. patent specification No. 934,444.

The organic hydroperoxides to be used according to the invention should have specific half value temperatures. By "half value temperature" we mean the temperature at which half of a given amount of peroxide has decomposed after one minute.

Specific examples of organic hydroperoxides having a half value temperature (Hvt.) within the range from 200° to 260° C. are p-menthane hydroperoxide (Hvt.=216°), cumene hydroperoxide (Hvt.=255° C.) and diisopropylbenzene monohydroperoxide (Hvt.=221° C.).

It has bene found that 2-hydroperoxy-2-(o-isopropylphenyl) - propane, 2-hydroperoxy-2(m-isopropylphenyl)-propane, 2-hydroperoxy-2-(p-isopropylphenyl) - propane and binary and ternary mixtures of these hydroperoxides are articularly suitable for the purposes of the invention. The half value temperatures of these peroxides and peroxide mixtures are 221°±5° C. It may be advantageous to use the peroxides in the form of solutions in inert solvents in the conventional manner. The oxygen may advantageously be used in the form of air.

The polymerization modifiers to be used according to the invention should have $C_s$ value of from $1 \times 10^{-2}$ to $4 \times 10^{-1}$ (cf. G.A. Mortimer, J. Polymer Sci., A/1,4, 881 (1966) for the concept and definition of $C_s$ value). Specific examples of such polymerization modifiers are acetone ($C_s$ value = $1.8 \times 10^{-2}$), n-butyraldehyde ($C_s$ value = $4.0 \times 10^{-1}$)

and cyclohexanone ($C_s$ value = $1.1 \times 10^{-1}$). It has been found that propionaldehyde $C_s$ value = $2.5 \times 10^{-1}$)

and methyl ethyl ketone ($C_s = 2.7 \times 10^{-2}$) are particularly suitable polymerization modifiers.

The ethylene homopolymers obtained by the process are particularly suitable for the production of highly transparent film and of strong packaging film and sheeting.

The invention is illustrated by the following example.

EXAMPLE

A conventional tubular reactor (jacketed for temperature control) having two successive reaction zones of equal length, the ratio of internal diameter to length being 1:10,000 in the first zone and 1:9,000 in the second zone.

A mixture at a temperature of 190° C. and under a pressure of 2300 atmospheres which contains 3000 parts by weight of ethylene, 0.08 part by weight (equivalent to 2 mole p.p.m. with reference to the ethylene) of a mixture of isomers of 2-hydroperoxy-2-(isopropylphenyl) - propane (in the form of a 2% by weight solution in methyl acetate; half value temperature=221° C.) and 15 parts of propionaldehyde (polymerization modifier;

$C_s$ value = $2.5 \times 10^1$)

is introduced continuously per hour at the beginning of the first reaction zone. The reaction temperature is kept at 310° to 315° C. by (a) the heat of reaction liberated and (b) the jacket cooling.

A mixture at a temperature of 160° C. and under a pressure of 2300 atmospheres which contains 3000 parts by weight of ethylene, 0.25 part by weight (equivalent to 16.8 mole p.p.m. of oxygen with reference to ethylene) of air and 7.5 parts by weight of propionaldehyde (polymerization modifier; $C_s$ value = $2.5 \times 10^{-1}$) is introduced continuously per hour at the beginning of the second reaction zone. The reaction temperature is kept at from 285° to 295° C.

The ethylene homopolymer obtained at the end of the second reaction zone and the unreacted components of the reaction mixture are brought by periodic lowering of the reactor pressure to 1600 atmospheres into a separator which is at a pressure of 250 atmospheres.

In this way 1430 parts by weight per hour of ethylene homopolymer is obtained (equivalent to a yield of 23.9%); it has an intrinsic viscosity of 4.1 g./10 minutes and a density of 0.925 g./cm.; its molecular weight distribution is narrow. The product in the form of film or sheeting is highly transparent and very glossy and exhibits high mechanical strength.

We claim:

1. A process for the continuous production of ethylene homopolymers by polymerization of ethylene under the action of organic hydroperoxides and oxygen as free-radical-generating polymerization initiators and of polymerization modifiers at reaction temperatures of 250° to 340° C. and pressures of 1500 to 4000 atmospheres in a tubular reactor having two successive reaction zones of about equal length, a mixture of ethylene, polymerization initiator and polymerization modifier being introduced continuously into the reactor at the beginning of each reaction zone, which comprises:

(1) introducing at the beginning of the first reaction zone a mixture at a temperature of from 185° to 220° C. and a pressure of from 1500 to 4000 atmospheres which contains an amount by weight equivalent to from 1 to 5 mole p.p.m. (with reference to the ethylene) of an organic hydroperoxide having a half value temperature within the range from 200° to 260° C. and 0.3 to 0.7 percent by weight of a polymerization modifier a $C_s$ value of $1.0 \times 10^{-2}$ to $4.0 \times 10^{-1}$, the reaction temperature in said zone being within the range from 305° to 340° C.; and (2) introducing at the beginning of the second reaction zone a mixture at a temperature of from 140° to 210° C. and a pressure of from 1500 to 4000 atmospheres which contains an amount by weight of oxygen which is equivalent to from 5 to 100 mole p.p.m. (with reefrence to the ethylene) and from 40 to 60% by weight of the amount used in said first reaction zone per 100 parts by weight of ethylene of a polymerization modifier having a $C_s$ value of from $1.0 \times 10^{-2}$ to $4.0 \times 10^{-1}$ and keeping the reaction temperature in said second reaction zone within the range from 250° to 305° C., with the proviso that the ratio by weight of the mixture introduced per unit time into said first and second reaction zones is from 1:2 to 2:1.

2. A process as claimed in claim 1 wherein said organic hydroperoxide is p-methane hydroperoxide, cumene hydroperoxide, diisopropylbenzene monohydroperoxide, 2-hydroperoxy-2-(o-isopropylphenyl)-propane, 2-hydroperoxy-2-(p-isopropylphenyl)-propane, or a binary or tertiary mixture of said last-mentioned propanes.

3. A process as claimed in claim 2 wherein said polymerization modifier is acetone, n-butyraldehyde, cyclohexanone, propionaldehyde or methyl ethyl ketone.

4. A process as claimed in claim 1 wherein said polymerization modifier is acetone, n-butyraldehyde, cyclohexanone, propionaldehyde or methyl ethyl ketone.

References Cited

UNITED STATES PATENTS

| 3,142,666 | 7/1964 | Deex et al. | 260—94.9 |
| 3,293,233 | 12/1966 | Erchak, Jr. et al. | 260—94.9 |
| 3,334,081 | 8/1967 | Madgwick et al. | 260—94.9 |

OTHER REFERENCES

Mortimer, G. A., Journal of Polymer Science A/1, 4 pp. 882–888 (1966).

JOSEPH L. SCHOFER, Primary Examiner

A. HOLLER, Assistant Examiner

PO-1050
(5/69)

UNITED STATES PATENT OFFICE
CERTIFICATE OF CORRECTION

Patent No. 3,657,211             Dated April 18, 1972

Inventor(s) Klaus Steigerwald et al

It is certified that error appears in the above-identified patent and that said Letters Patent are hereby corrected as shown below:

Column 2, line 70, "bene" should read -- been --.

Column 3, line 2, "articularly" should read -- particularly --; line 65, "cm." should read -- ccm. --.

Column 4, line 23, claim 1, "modifier a $C_8$" should read -- modifier having a $C_8$ --; line 31, claim 1, "reefrence" should read -- reference --; line 42, claim 2, "p-methane" should read -- p-menthane --.

Signed and sealed this 21st day of November 1972.

(SEAL)
Attest:

EDWARD M. FLETCHER, JR.            ROBERT GOTTSCHALK
Attesting Officer                       Commissioner of Patents